United States Patent [19]

Boor

[11] 4,417,485
[45] Nov. 29, 1983

[54] COUPLED PLANETARY GEAR SPEED REDUCER FOR USE IN INDUSTRIAL VEHICLES

[75] Inventor: Frank H. Boor, Fort Meyers, Fla.

[73] Assignee: Fairfield Manufacturing Co., Inc., Lafayette, Ind.

[21] Appl. No.: 235,773

[22] Filed: Feb. 19, 1981

Related U.S. Application Data

[63] Continuation-in-part of Ser. No. 73,391, Sep. 7, 1979, abandoned.

[51] Int. Cl.³ .............................................. F16H 3/44
[52] U.S. Cl. ...................................................... 74/785
[58] Field of Search .................... 74/785, 801, 750 R, 74/786, 788

[56] References Cited

U.S. PATENT DOCUMENTS 3,115,204  12/1963  Dence .................................. 74/785
3,686,978  8/1972  Knoblach et al. .................... 74/801
4,158,971  6/1979  Szalai et al. .......................... 74/801

FOREIGN PATENT DOCUMENTS 529842  7/1954  Belgium ................................ 74/801

OTHER PUBLICATIONS

Planetary Gear Systems, John Glover Jan. 6, 1964, pp. 59 and 61.

Primary Examiner—Leslie A. Braun
Assistant Examiner—Frank H. McKenzie, Jr.
Attorney, Agent, or Firm—John M. Neary; Vance A. Smith

[57] ABSTRACT

A coupled planetary gear system for use preferably with the wheel assembly of large vehicles in which the secondary planet gears and the primary ring gear are secured to the wheel assembly. The input shaft drives the primary sun gear, and the primary planet gears drive the secondary sun gear.

4 Claims, 5 Drawing Figures

COUPLED PLANETARY GEAR SPEED REDUCER FOR USE IN INDUSTRIAL VEHICLES

BACKGROUND OF THE DISCLOSURE

This is a continuation-in-part of application Ser. No. 073,391, filed Sept. 7, 1979 now abandoned.

In transferring the rotary power supplied through a differential to the wheel assemblies of a vehicle, it is essential that the high speed rotation emanating from the differential be reduced to a usable level. For some applications, such as very large, off-the-road trucks, it is desirable to achieve a reduction ratio in the range of from 10:1 to 15:1. The prior art includes many arrangements of planetary gears adapted to provide various gear ratios, but there is not an arrangement which provides the desired 10 to 15:1 ratio in a practical, efficient and reliable manner. While, in theory, many different sizes of gears can be used in the arrangement of the prior art in order to achieve the desired ratios, there is a practical limit to the sizes of gears that can be used. In order for most prior arrangements to achieve the desired 10 to 15:1 ratios, they must employ very small planetary gears. The use of small planetary gears necessitates the use of small bearings, which increases the incidence of mechanical failure. Additionally, there may be a problem in maintaining temperature levels low enough for efficient operation of the system as, in general, all of the components must be commonly housed.

The typical tandem planetary gear arrangement of the prior art has both primary and secondary ring gears fixed to the frame, with the primary sun gear driving the primary plant gears, which, by means of carriers, drive the secondary sun gear. The secondary sun gear drives the secondary planet gears, and the output is taken from carriers attached to the secondary planet gears. This arrangement is shown schematically in FIG. 4. The speed reduction formula for this arrangement, where S is the primary sun gear, R is the primary ring gear, S' is the secondary sun gear and R' is the secondary ring gear, is as follows:

$$\left(\frac{R}{S} + 1\right)\left(\frac{R'}{S'} + 1\right).$$

The speed ratios that would be achieved by the typical apparatus for different sizes of gears will be illustrated in the Description of Preferred Embodiment, where those ratios will be compared to the ratios achieved by the present invention.

Examples of a planetary gear arrangement that seems to be the closest to the arrangement of the present invention are shown in Belgian Pat. No. 529842 and U.S. Pat. No. 4,158,971, both patents being hereby incorporated by reference. Both the Belgian apparatus and the U.S. apparatus include a two-stage double planetary gear arrangement in which the two ring gears rotate with the power output member. Each apparatus has two planet carriers, one fixed and the other rotating. Using the same symbols as above to represent the number of teeth in the respective gears, the speed ratio formula for both the U.S. and the Belgian apparatus is $$\left(1 + \frac{R}{S}\right)\left(-\frac{R'}{S'}\right) - \frac{R}{S}.$$

The speed ratios that would be achieved by the Belgian apparatus for different sizes of gears will be illustrated in the Description of the Preferred Embodiment, where those ratios will be compared to the ratios achieved by the present invention.

There are many other gear arrangements which have been used in the past, but they are different from the arrangement of the present invention and do not provide the same speed ratio for the same sized gears.

It is a paramount object of the present invention to provide a novel planetary gear reduction system for use in vehicles, particularly in large industrial vehicles, which system provides for a speed reduction in the range of from 10:1 to 15:1 concomitantly with maintaining proper temperature levels, and reducing weight requirements without the attendant disadvantages prevalent among prior art speed reducers applied in large vehicles.

SUMMARY OF THE INVENTION

A coupled planetary gear system is positioned in close proximity to the wheel assembly of a vehicle. A rotating shaft generally extending from the vehicle differential provides the input. The gear system itself is comprised of a coupled planetary gear sytem having primary and secondary planetary gear drives. The sun gear of the secondary gear drive is mounted over the input shaft and meshes with a plurality of secondary planet gears, each rotatably mounted on a shaft attached to the wheel assembly. The ring gear of the secondary gear drive is secured to the fixed housing.

The sun gear of the primary planetary gear drive is positioned outwardly from the secondary sun gear and is driven directly by the input shaft. Meshing with the primary sun gear is a group of primary gears, which rotate about the sun gear, and a primary ring gear which is attached to the wheel assembly. The primary planet gears drive the secondary sun gear.

The output of the planetary gear system can be taken between the two planetary gear drives from the planet gears of the secondary gear drive and the ring gear of the primary gear drive. The location of output permits an advantageous reduction in the size of the main housing since the primary planetary gear drive can be positioned outside of the housing. This also decreases the number of components and, under heavy loads, provides better temperture control.

DETAILED DESCRIPTION OF THE INVENTION

Figure 1:
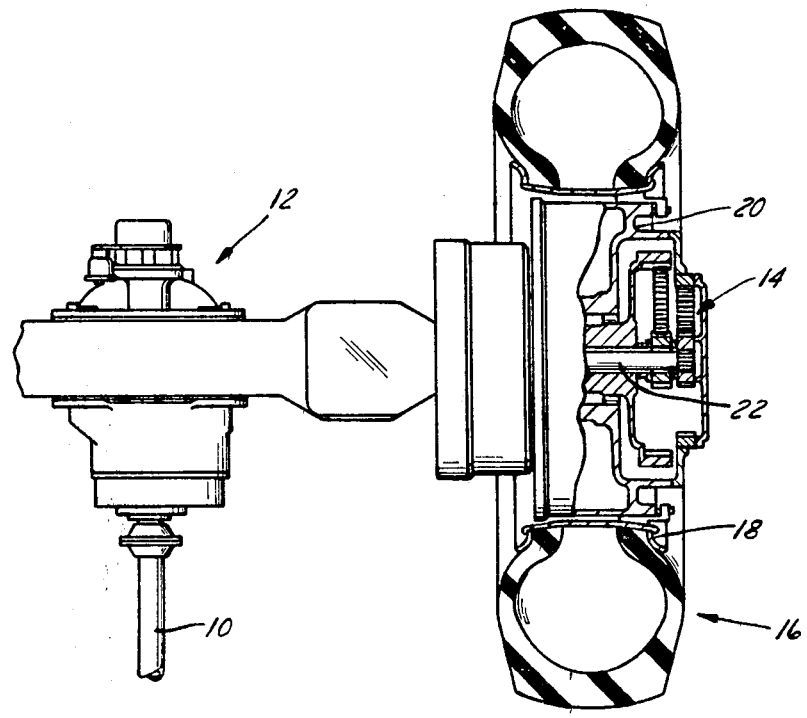
FIG. 1 is a sectional view showing the proximity of the planetary gear system to a vehicle transmission.
Figure 2:
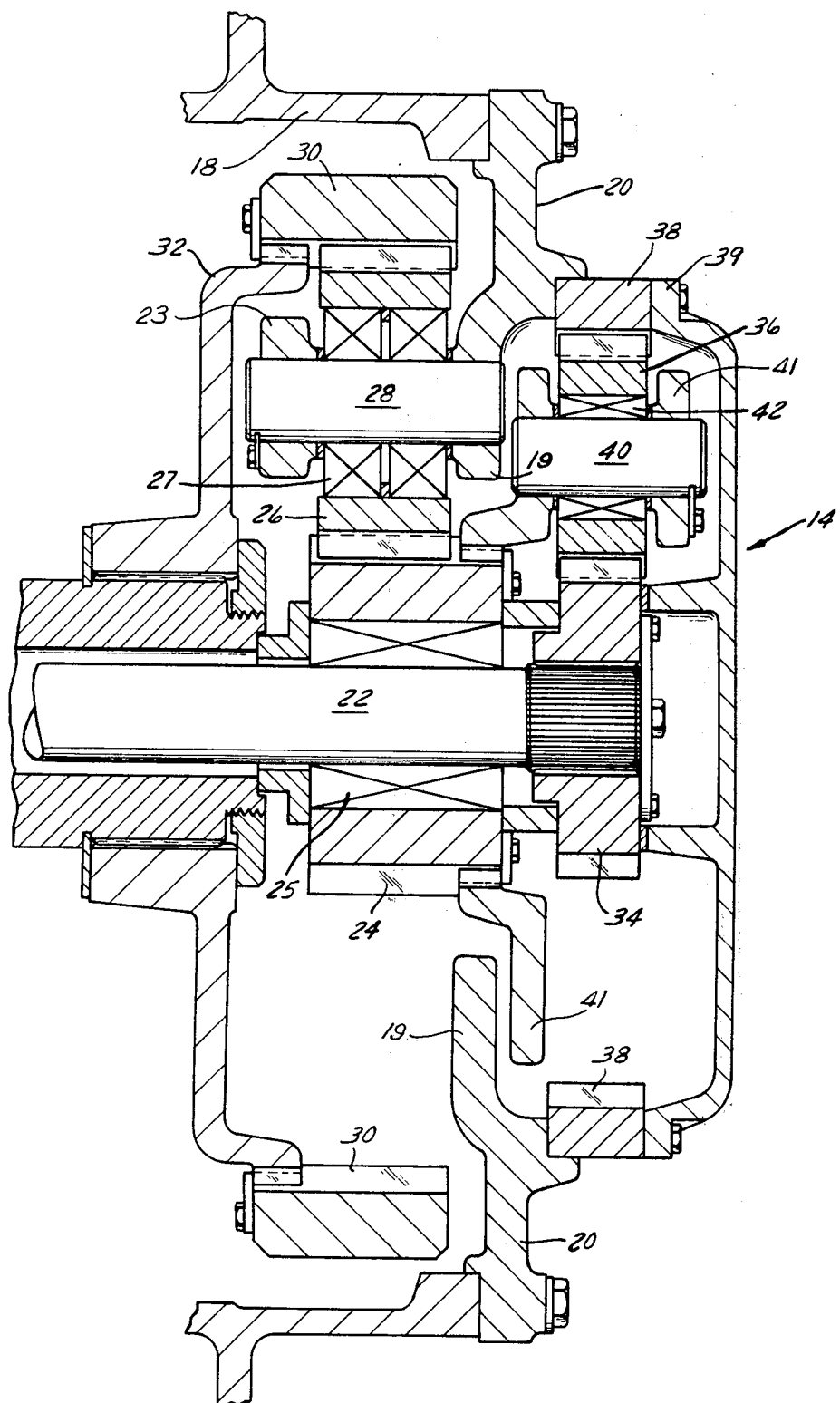
FIG. 2 is a more detailed sectional view of the planetary gear system in accordance with the present invention.

From the plan view of FIG. 1, it may be seen that a rotating input shaft 10 extends to the differential housing 12, and the differential in turn transfers power through a high speed drive shaft 22 to a speed reducer 14 which is housed adjacent to wheel assembly 16. As part of assembly 16, wheel 18 is mounted on wheel assembly housing 20 which is driven by speed reducer 14. The details of the speed reducer may be seen in the sectional view of FIG. 2.

Shaft 22 is the input driving the planetary gear reducer. Secondary sun gear 24 as illustrated is rotatably mounted with respect to shaft 22 and may be supported via bearings 25. A plurality of secondary planet gears 26, preferably three, is rotatably mounted via bearings 27 on shafts 28 which are in turn mounted in a secondary planet gear carrier 23 formed integrally with a radial extension 10 of the wheel assembly housing 20. These secondary planet gears 26 hold secondary sun gear 24 in place so that it floats over shaft 22. Secondary ring gear 30 is bolted to a fixed portion of the vehicle, herein shown as frame extension 32.

Shaft 22 is splined at one end and meshes with primary sun gear 34. A plurality of primary planet gears 36, preferably three, float between primary sun gear 34 and primary ring gear 38, the latter being bolted into wheel assembly housing 20. Primary planet gears 36 are rotatably mounted on shafts 40 with appropriate bearings 42. Primary planet gears 36 drive secondary sun gear 24 by means of a carrier 41 into which shafts 40 are mounted.

In operation, shaft 22 drives primary sun gear 34, causing the rotation of primary planet gears 36 about shafts 40. This rotation of primary planet gears 36, which mesh with primary ring gear 38, also causes shafts 40 of primary planet gears 36 and the primary planet gear carrier 41 to move relative to primary ring gear 38. Because primary ring gear 38 is attached to wheel assembly housing 20 which is moving in the same direction as the carrier 41, it causes the carrier 41 to move faster relative to a fixed portion of the vehicle than they would if primary ring gear 38 were fixed. This causes carrier 41 to transfer a higher-speed rotation to secondary sun gear 24 than would be the case if primary ring gear 38 were fixed to frame extension 32 and therefore results in less speed reduction than would be the case if primary ring gear 38 were fixed to the frame. Secondary sun gear 24 causes secondary planet gears 26 to rotate about their shafts 28. The rotation of secondary planet gears 26, which mesh with secondary ring gear 30, also causes the secondary planet gear carrier 23 to move relative to secondary ring gear 30. Secondary ring gear 30 is fixed to frame extension 32 and therefore does not move relative to the vehicle. Since shafts 28 are mounted in the carrier 23 which is integral with the wheel assembly housing 20, the motion of the carrier 23 relative to ring gear 30, which is fixed to the frame, is then transferred to wheel assembly housing 20 for output to wheel assembly 16.

The speed ratio formula for the present invention is:

$$\left(1 + \frac{R}{S}\right)\left(\frac{R'}{S'}\right) + 1,$$

where: R is the number of the teeth in the primary ring gear 38; S is the number of the teeth in the primary sun gear 34; R' is the number of teeth in the secondary ring gear 30; and S' is the number of teeth in the secondary sun gear 24.

Figure 5:
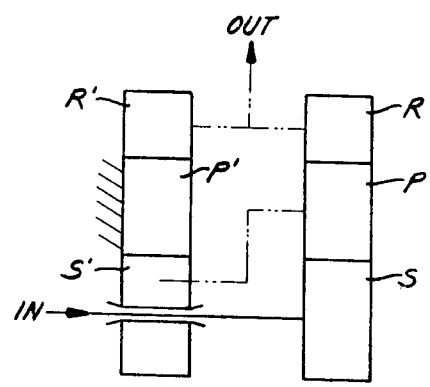
FIG. 5 is a diagrammatical view of the planetary gear system shown in another form of prior art planetary gear system.

Using the same reference letters for the various gears, the ratio formula for the prior art illustrated schematically in FIG. 5 is:

$$\left(1 + \frac{R}{S}\right)\left(-\frac{R'}{S'}\right) - \frac{R}{S}.$$

Figure 4:
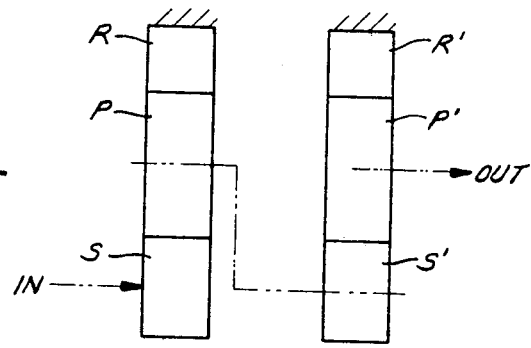

The ratio formula for the typical tandem planetary gear arrangement referred to earlier in this specification and illustrated schematically in FIG. 4 is $$\left(\frac{R'}{S'} + 1\right)\left(\frac{R}{S} + 1\right).$$

It can readily be seen that the three speed ratio formulas are different, but the following table best illustrates the difference in speed ratios which will be produced by various gear sizes operating in the three arrangements. In the following table, the numbers under column headings R, S, R' and S' represent the number of teeth in those respective gears.

Figure 3:
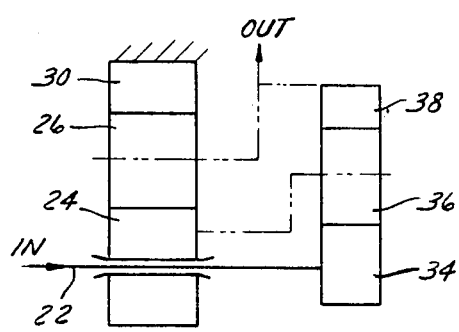
FIG. 3 is a diagrammatical view of the planetary gear system.
Figure 4A:
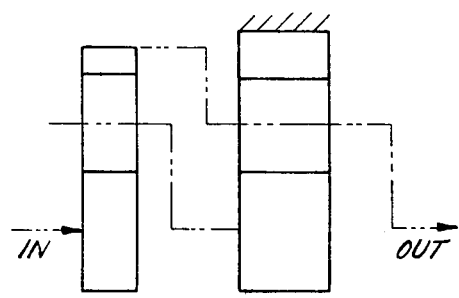
FIG. 4 is a diagrammatical view of a typical planetary gear system of the prior art.

| R | S | R' | S' | Speed Ratio of present invention (FIG. 3) | Speed Ratio of prior art arrangement (FIG. 5) | Speed Ratio of typical arrangement (FIG. 4) |
|---|---|---|---|---|---|---|
| 90 | 30 | 90 | 30 | 13 | −15 | 16 |
| 90 | 30 | 60 | 15 | 17 | −19 | 20 |
| 80 | 30 | 80 | 30 | 10.8 | −12.4 | 13.4 |
| 78 | 36 | 69 | 27 | 9.1 | −10.2 | 11.2 |

It can be readily seen that the different gear arrangements provide quite different speed ratios, with only the present invention exhibiting speed ratios throughout the range of from 10:1 to 15:1 for gears in a reasonable size range and large enough to operate reliably. The arrangement of gears shown in FIG. 5 actually results in the wheels being turned in the opposite direction to the direction of the input, as indicated by the minus sign (−) preceding the speed ratio values.

Because of the particular structure of the planetary gear assembly of the present invention, it can be seen that the output is not taken from the "remote side" of the planetary gear drive, i.e., the side opposite the differential, but is instead taken through the radial extension 19 of the wheel assembly housing 20 between the primary and secondary gear drives. The major advantage that this structure provides is a speed reduction in the range of from 10:1 to 15:1 when using gears of a size large enough to permit reliable operation. It also eliminates the need for the main portion of wheel assembly housing 20 to include the primary gear drive. Instead, a lighter auxiliary housing 39 covers the components. This results in less weight for the total gear assembly which is an attractive economic advantage. The extension of the primary gear drive outside of wheel assembly housing 20 also provides for cooler operating temperatures under heavy loads.

What is claimed is:

1. In a vehicle having a speed reduction planetary gear drive system located adjacent a wheel assembly housing rotatably mounted on an axle, said gear system comprising:
   (a) a frame extension fixedly secured to the vehicle;
   (b) a rotatable input shaft means extending from a source of rotary power and being capable of high speed rotation;
   (c) a secondary planetary gear drive comprising a secondary sun gear mounted rotatably with respect to said input shaft means, a group of secondary planet gears each rotatably mounted on a shaft secured to the wheel assembly housing, and a secondary ring gear fixedly secured to the frame extension; and
   (d) a primary planetary gear drive positioned outwardly from said secondary gear drive and having a primary sun gear fixedly secured to and for rotation with said input shaft, a primary ring gear rotatable with respect to said frame extension and secured to said wheel assembly housing, and a group of primary planet gears driving said secondary sun gear and rotatably mounted between said primary sun gear and said primary ring gear.

2. In the vehicle of claim 1, said primary planetary gear drive being positioned outside of said wheel assembly housing.

3. The gear system defined in claim 1, further comprising:
   a primary planet gear carrier in which said primary planet gears are mounted and having gear teeth thereon engaged with said secondary sun gear for driving said secondary sun gear;
   a radial extension on said wheel assembly housing extending radially between said primary and said secondary planet gears and being drivingly connected to a secondary planet gear carrier.

4. The gear system defined in claim 3, wherein said primary planet carrier engages said secondary sun gear in radial alignment with said wheel assembly extension.

* * * * *